(12) United States Patent
Pinkos et al.

(10) Patent No.: US 7,276,573 B2
(45) Date of Patent: Oct. 2, 2007

(54) METHOD FOR PRODUCING MONOESTERS AND DIESTERS OF POLYTETRAHYDROFURAN AND OF TETRAHYDROFURAN COPOLYMERS

(75) Inventors: Rolf Pinkos, Bad Dürkheim (DE); Achim Gerstlauer, Ludwigshafen (DE); Martin Haubner, Eppelheim (DE); Stephan Schlitter, Limburgerhof (DE); Stefan Käshammer, Schifferstadt (DE); Klaus-Peter Pfaff, Friedelsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 55 days.

(21) Appl. No.: 10/527,583

(22) PCT Filed: Sep. 4, 2003

(86) PCT No.: PCT/EP03/09807

§ 371 (c)(1),
(2), (4) Date: Mar. 14, 2005

(87) PCT Pub. No.: WO2004/031260

PCT Pub. Date: Apr. 15, 2004

(65) Prior Publication Data

US 2006/0052551 A1    Mar. 9, 2006

(30) Foreign Application Priority Data

Sep. 12, 2002 (DE) .............................. 102 42 286

(51) Int. Cl.
C08G 65/04 (2006.01)
C07D 307/00 (2006.01)
C07C 67/24 (2006.01)

(52) U.S. Cl. .................. 528/408; 528/417; 528/403; 549/429; 549/472; 560/240; 568/617

(58) Field of Classification Search .................. 526/62; 528/408, 417, 403; 549/429, 472; 560/240; 568/617

See application file for complete search history.

(56) References Cited

U.S. PATENT DOCUMENTS 3,433,829 A    3/1969    Dörfelt et al.
4,120,903 A    10/1978   Pruckmayr et al.
4,460,796 A    7/1984    Mueller
4,568,775 A    2/1986    Aoshima et al.
5,138,032 A *  8/1992    Mastenbroek et al. ...... 528/392
5,208,385 A    5/1993    Kahn et al.
5,641,857 A *  6/1997    Dostalek et al. ............ 528/361
5,659,068 A    8/1997    Weyer et al.
5,773,648 A    6/1998    Becker et al.
5,886,138 A    3/1999    Müller
5,939,590 A *  8/1999    Sigwart et al. ............. 568/616
6,252,039 B1 * 6/2001    Becker et al. ............. 528/485
6,271,413 B1   8/2001    Müller
6,359,108 B1 * 3/2002    Eller et al. .................. 528/411
6,455,711 B1   9/2002    Eller et al.
2003/0176630 A1* 9/2003  Bohner et al. ............. 528/403
2004/0220381 A1* 11/2004 Schlitter et al. ............ 528/408

FOREIGN PATENT DOCUMENTS

| DE | 1 226 560 | 12/1964 |
|----|-----------|---------|
| DE | 43 16 138 | 11/1994 |
| DE | 43 16 138 A1 | 11/1994 |
| DE | 44 33 606 A1 | 3/1996 |
| DE | 195 13 493 C2 | 3/1996 |
| DE | 101 30 782 | 1/2003 |
| DE | 101 30 782 A1 | 1/2003 |
| EP | 0 503 394 A2 | 9/1992 |
| EP | 0 535 151 | 4/1993 |
| JP | 04-306 228 | 10/1992 |
| WO | WO-90/14327 | 11/1990 |
| WO | WO-91/19818 | 12/1991 |
| WO | WO-94/05719 | 3/1994 |
| WO | WO-96/23833 | 8/1996 |
| WO | WO-98/51729 | 11/1998 |
| WO | WO-99/12992 | 3/1999 |
| WO | WO 200202669 A1 * | 1/2002 |
| WO | WO 2003002631 A1 * | 1/2003 |

* cited by examiner

Primary Examiner—Randy Gulakowski
Assistant Examiner—A. Toscano
(74) Attorney, Agent, or Firm—Connolly Bove Lodge and Hutz

(57) ABSTRACT

The present invention provides a process for preparing mono- or diesters of polytetrahydrofuran or of tetrahydrofuran copolymers by polymerizing tetrahydrofuran in the presence of at least one telogen and/or of a comonomer over an acidic catalyst, wherein the polymerization reactor is started up using a mixture of polytetrahydrofuran, the mono- or diesters of polytetrahydrofuran and/or of the THF copolymers, tetrahydrofuran, any comonomer and at least one carboxylic acid and/or one carboxylic anhydride.

14 Claims, No Drawings

METHOD FOR PRODUCING MONOESTERS AND DIESTERS OF POLYTETRAHYDROFURAN AND OF TETRAHYDROFURAN COPOLYMERS

CROSS REFERENCE TO RELATED APPLICATION

The present application is a National Stage application of PCT/EP2003/009807, filed Sep. 4, 2003, which claims priority from German Patent Application No. DE 102 42 286.9, filed Sep. 12, 2002.

The present invention relates to a process for preparing mono- and diesters of polytetrahydrofuran or of tetrahydrofuran copolymers, which is notable for the use of a mixture of polymer, tetrahydrofuran, comonomer and carboxylic acid and/or carboxylic anhydride to start up the polymerization reactor.

Polytetrahydrofuran (referred to hereinbelow as PTHF), also known as polyoxybutylene glycol, is a versatile intermediate in the plastics and synthetic fibers industry and its uses include use as a diol component in the preparation of polyurethane elastomers, polyester elastomers and polyamide elastomers. In addition, like some of its derivatives, it is a valuable assistant in many applications, for example as a dispersant or when deinking waste paper.

PTHF is customarily prepared industrially by polymerizing tetrahydrofuran (referred to hereinbelow as THF) over suitable catalysts in the presence of reagents whose addition allows the chain length of the polymer chains to be controlled and thus the average molecular weight to be set (chain termination reagents or telogens). The control is effected by the selection of the type and amount of the telogen. The choice of suitable telogens additionally allows functional groups to be introduced at one end or both ends of the polymer chain.

For example, the use of carboxylic acids or carboxylic anhydrides as telogens allows the mono- or diesters of PTHF to be prepared. PTHF is not formed itself until subsequent hydrolysis or transesterification. This process is therefore referred to as the two-stage PTHF process.

Other telogens do not only function as chain termination reagents, but are also incorporated into the growing polymer chain of PTHF. They do not only have the function of a telogen, but are also simultaneously a comonomer, and may therefore equally well be referred to as telogens or comonomers. Examples of such comonomers include telogens having two hydroxyl groups, such as the diols (dialcohols). Examples of these include ethylene glycol, propylene glycol, butylene glycol, 1,3-propanediol, 1,4-butanediol, 2-butyne-1,4-diol, 1,6-hexanediol or low molecular weight PTHF. Further suitable comonomers include cyclic ethers such as 1,2-alkylene oxides, e.g. ethylene oxide or propylene oxide, 2-methyltetrahydrofuran or 3-methyltetrahydrofuran. With the exception of water, 1,4-butanediol and low molecular weight PTHF, the use of such comonomers leads to the production of tetrahydrofuran copolymers, referred to hereinbelow as THF copolymers, and thus makes it possible to chemically modify PTHF.

On the industrial scale, the abovementioned two-stage processes are generally carried out, in which THF, for example in the presence of fluorosulfonic acid, is initially polymerized to polytetrahydrofuran esters and subsequently hydrolyzed to PTHF. Customarily, this form of THF polymerization achieves higher THF conversions than one-stage processes. A particularly advantageous process is THF polymerization in the presence of carboxylic anhydrides or carboxylic anhydride/carboxylic acid mixtures, for example acetic anhydride or acetic anhydride/acetic acid mixtures, in the presence of acidic catalysts to give PTHF acetates and the subsequent transesterification of the PTHF acetates, for example with methanol to give PTHF and methyl acetate.

The preparation of PTHF esters preferred in this application by THF polymerization in the presence of carboxylic anhydrides and/or carboxylic anhydride/carboxylic acid mixtures or the preparation of THF copolymers by THF polymerization in the presence of carboxylic anhydrides and/or carboxylic anhydride/carboxylic acid mixtures and cyclic ethers as comonomers over solid acidic catalysts is therefore known per se.

DE-A 44 33 606 describes, inter alia, the preparation of PTHF and PTHF diesters by polymerizing THF over a heterogeneous catalyst in the presence of a $C_1$- to $C_{10}$-monocarboxylic acid or of a carboxylic anhydride of a $C_2$- to $C_{20}$-monocarboxylic acid over a tungsten- and molybdenum-containing supported catalyst. After charging the polymerization reactor with catalyst, THF and the particular telogen are added and reacted until the desired conversion of THF has been achieved.

DE-A 12 26 560 states that to prepare PTHF diesters, THF, acetic anhydride and montmorillonite as the catalyst are mixed in a polymerization vessel and then the polymerization is started up.

The processes mentioned indicate that the polymerization reactor and hence the polymerization reaction is generally started up using a mixture of THF and telogen. This may be the first startup of a reactor, or else a restart, for example after a plant shutdown for the purposes of maintenance. In the case of a continuously operated reactor, the startup procedure is complete when the customary in-process liquid fill level of the reactor has been reached, and when temperature, pressure and composition of the reactor contents without feed of starting materials no longer change significantly as a function of time.

For industrial scale plants, startup using THF and telogen is a high safety risk. The reaction enthalpy per mole of reacted THF is approx. −20 kJ. At a THF conversion of 40% this results in adiabatic heating of about 60 K. The heat energy released may only be safely removed at high technical cost and inconvenience.

It is an object of the present invention to provide a novel process for preparing mono- or diesters of polytetrahydrofuran or of THF copolymers in the presence of acidic catalysts, which allows the polymerization reactor to be started up safely.

We have found that this object is achieved by a process for preparing mono- or diesters of polytetrahydrofuran or of tetrahydrofuran copolymers by polymerizing tetrahydrofuran in the presence of at least one telogen and/or of a comonomer over an acidic catalyst, wherein the polymerization reactor is started up using a mixture of polytetrahydrofuran, the mono- or diesters of polytetrahydrofuran and/or the tetrahydrofuran copolymers, tetrahydrofuran, any comonomer and at least one carboxylic acid and/or one carboxylic anhydride.

It has now been found that, surprisingly, when compared with the above-described startup method using tetrahydrofuran and acetic acid and/or acetic anhydride, the process according to the invention achieves an increase in the THF conversion of up to 5.5% and an increase in the acetic anhydride conversion by up to 2.0%.

According to the invention, the polymerization reactor is started up using a mixture which, in addition to tetrahydrofuran, carboxylic acid and/or carboxylic anhydride and, in the case of preparation of copolymers, comonomer already contains polymer. This polymer is preferably the mono- or diester of PTHF or of THF copolymer to be prepared by the preparative process according to the invention, i.e. the polymer desired as the product of polymerization. However, it is also possible to use polytetrahydrofuran.

The PTHF or the mono- or diester of PTHF or of THF copolymer used for the process according to the invention for starting up the reactor should have an average molecular weight $M_n$ of from 650 to 4000.

In this application, the term "average molecular weight" or "average molar mass" refers to the number average $M_n$ of the molecular weight of the polymer which is determined by wet-chemical OH number determination.

The hydroxyl number is that amount of potassium hydroxide in mg which is equivalent to the amount of acetic acid bonded in the acetylation of 1 g of substance. The hydroxyl number is determined by the esterification of the hydroxyl groups present with an excess of acetic anhydride. After the reaction, the excess acetic anhydride is hydrolyzed with water and back-titrated as acetic acid using sodium hydroxide solution.

The concentration of the polymer used for startup (PTHF, mono- or diester of PTHF or of THF copolymer) in the mixture used for startup is from 20 to 80% by weight, based on the total amount of the mixture of polymer, telogen and/or comonomer and THF used for startup, preferably from 30 to 65% by weight.

The mixture used for starting up the polymerization reactor has a tetrahydrofuran content of from 7 to 80% by weight or, when preparing THF copolymers, the total amount of tetrahydrofuran and comonomer is from 7 to 80% by weight, based on the total amount of the mixture of polymer, telogen, THF and comonomer used for startup, preferably from 29 to 69% by weight, based on the total amount of the mixture used for startup.

Since the telogen leads to chain termination, the amount of telogen added can be used to control the molecular weight of the polymer to be prepared.

Useful telogens in the preparation of mono- and diesters of PTHF or of THF copolymers include carboxylic anhydrides and/or carboxylic acids.

Preference is given to using organic carboxylic acids or their anhydrides. These include aliphatic and aromatic poly- and/or monocarboxylic acids which contain from 2 to 12, preferably from 2 to 8, carbon atoms, and preferred examples of aliphatic carboxylic acids are acetic acid, acrylic acid, lactic acid, propionic acid, valeric acid, caproic acid, caprylic acid and pelargonic acid, of which acetic acid is preferred. Examples of aromatic carboxylic acids include phthalic acid and naphthalene carboxylic acid. Examples of anhydrides of aliphatic polycarboxylic acids include acrylic anhydride, succinic anhydride and maleic anhydride. Preference is given in particular to acetic anhydride.

For the process according to the invention, the carboxylic anhydride used as telogen is used in an amount of from 0.5 to 10% by weight, preferably from 0.5 to 5% by weight, based on the total amount of the mixture of polymer, THF and any comonomer and telogen used for startup. The telogen is added to the polymerization optionally together with the comonomer, advantageously dissolved in THF.

When a carboxylic acid is used as a telogen in addition to the carboxylic anhydride, its concentration is up to 3% by weight, preferably from 0.1 to 1% by weight, based on the total amount of polymer, THF, comonomer and telogen used for startup.

Depending on the telogen content of the polymerization mixture, the process according to the invention can be used in a targeted manner to prepare mono- and diesters of PTHF and of THF copolymers having average molecular weights of from 250 to 10 000 dalton, and the process according to the invention is preferably used to prepare the particular PTHF esters or esters of the THF copolymers having average molecular weights of from 500 to 5000 dalton, more preferably from 650 to 4000 dalton.

The mono- and diesters of the THF copolymers can be prepared by the additional use of cyclic ethers as comonomers which can be polymerized with ring opening, preferably three-, four- and five-membered rings, such as 1,2-alkylene oxides, e.g. ethylene oxide or propylene oxide, oxetane, substituted oxetanes, such as 3,3-dimethyloxetane, the THF derivatives 2-methyltetrahydrofuran or 3-methyltetrahydrofuran, and particular preference is given to 2-methyltetrahydrofuran or 3-methyltetrahydrofuran.

In the process according to the invention, the polymerization reactor may be started up using a solvent-containing or solvent-free mixture of PTHF, mono- or diester of PTHF or the THF copolymer, THF, comonomer and also carboxylic acid and/or carboxylic anhydride. The solvent has to be inert under the reaction conditions. Examples of such solvents include linear or branched $C_5$- to $C_{12}$-alkanes, for example n-hexane, n-heptane, n-octane, cyclohexane, halogenated hydrocarbons, for example dichloromethane, or aromatic hydrocarbons such as toluene, xylene, ethylbenzene.

Preference is given to carrying out the process according to the invention without solvent.

The selection of the acid catalyst used for the polymerization is not critical per se for the process according to the invention. The process according to the invention may be performed using all acidic, preferably heterogeneous catalysts suitable for the polymerization of THF. Examples include catalysts based on bleaching earths, as described, for example, in DE-A 1 226 560. Bleaching earths, especially activated montmorillonite, may be used as shaped bodies in a fixed bed or in suspension.

Catalysts based on mixed metal oxides for the polymerization of THF are also known. For instance, JP-A 04-306 228 describes the polymerization of THF in the presence of a carboxylic anhydride over a mixed metal oxide consisting of metal oxides of the formula $M_xO_y$, where x and y are integers in the range 1-3. Examples mentioned are $Al_2O_3$—$SiO_2$, $SiO_2$—$TiO_2$, $SiO_2$—$ZrO_2$ and $TiO_2$—$ZrO_2$.

U.S. Pat. No. 5,208,385 discloses catalysts based on amorphous silicon/aluminum mixed oxides. Mixed oxides based on $SnO_2/SiO_2$, $Ga_2O_3/SiO_2$, $Fe_2O_3/SiO_2$, $In_2O_3/SiO_2$, $Ta_2O_5/SiO_2$ and $HfO_2/SiO_2$ are also known. The abovementioned catalysts are preferably prepared by coprecipitation/sol gel methods. DE-A 44 33 606 discloses supported catalysts comprising tungsten oxide or molybdenum oxide applied, for example, to $ZrO_2$, $TiO_2$, $HfO_2$, $Y_2O_3$, $Fe_2O_3$, $Al_2O_3$, $SnO_2$, $SiO_2$ or $ZnO$. $ZrO_2/SiO_2$ catalysts are also recommended, in which the support has an alkali metal concentration of <5000 ppm.

Catalysts based on acidic ion exchangers for the polymeratio of THF, in particular alpha-fluorosulfonic acid-containing polymers (for example Nafion®), in the presence of acetic anhydride are described in U.S. Pat. No. 4,120,903. Further suitable catalysts for THF polymerization comprise a metal and perfluoroalkylsulfonic acid anions.

In addition, known polymerization catalysts also include further optionally activated clay minerals, disclosed, for example, in WO 94/05719, WO 96/23833, WO 98/51729, WO 99/12992 and DE-A 195 134 93. Zeolites are also suitable as catalysts and are described, for example, in DE-A 43 16 138.

Finally, sulfated zirconium oxides, sulfated aluminum oxides, supported heteropolyacids and supported ammonium bifluoride ($NH_4F$*HF or antimony pentafluoride) are known as suitable polymerization catalysts. Preference is given to carrying out the process according to the invention using activated bleaching earths.

An example of a useful pretreatment of the catalyst is drying with gases, e.g. air or nitrogen, heated to from 80 to 200° C., preferably to from 100 to 150° C.

However, it has been recognized within the scope of the invention that the pretreatment of the catalysts may be dispensed with when the proportion of acetic anhydride in the mixture which is used for startup is increased. The reference point used may be the water content of the catalyst. In the estimation, it should be assumed that one mole of water physically bound to the catalyst (drying loss at 150° C.) means an excess requirement of from 1 to 1.5 mol of acetic anhydride.

For industrial scale fixed bed reactors with their large holdup of catalyst, the dispensation with the drying of the catalyst means an enormous time advantage when a catalyst change is carried out. This increases the availability of the plants and thus reduces the production costs. In processes employing suspended catalysts, for example stirred or fluidized bed reactors, the costly and inconvenient pretreatment of the catalyst in a separate plant and also the storage under dry inert gases become unnecessary.

The polymerization is generally carried out at temperatures of from 0 to 80° C., preferably from 25° C. to the boiling temperature of THF. The pressure employed is generally not critical for the result of the polymerization, which is why operation is generally effected under atmospheric pressure or under the autogenous pressure of the polymerization system. Exceptions include copolymerizations of THF using the volatile 1,2-alkylene oxides, which are advantageously performed under pressure. Typically, the pressure is from 0.1 to 20 bar, preferably from 0.5 to 2 bar.

To avoid the formation of ether peroxides, the polymerization is advantageously performed under an inert gas atmosphere. Examples of useful inert gases include nitrogen, carbon dioxide or the noble gases, and preference is given to using nitrogen.

In continuous operation, the reaction may be performed in a suspension or fixed bed method in conventional reactors or reactor arrangements suitable for continuous processes, in the case of the suspension method, for example, in loop reactors, tubular reactors or fluidized bed reactors, and, in the case of the fixed bed method, in tubular reactors with or without product recycling, and preference is given to the fixed bed method.

In the fixed bed method, the catalyst used according to the invention is introduced into the reactor before charging the reactor with the mixture used for startup. However, it is also possible to first initially charge the mixture used for startup or a solvent and to add the catalyst in solid or suspended form.

In the preferred fixed bed method, the polymerization reactor may be operated in the liquid phase method, i.e. the reaction mixture is conducted from bottom to top, or in the trickle method, i.e. the reaction mixture is conducted through the reactor from top to bottom. The reactant mixture (feed) of THF and telogen and/or comonomer is fed continuously to the polymerization reactor, at a catalyst hourly space velocity of from 0.01 to 2.0 kg of THF/(l of catalyst*h), preferably from 0.02 to 1.0 kg of THF/(l of catalyst*h) and more preferably from 0.04 to 0.5 kg of THF/(l of catalyst*h).

The polymerization reactor may also be operated in straight pass, i.e. without product recycling, or in circulation, i.e. a portion of the polymerization mixture leaving the reactor is conducted in a circuit. In the circulation method, the ratio of circulation to feed is less than or equal to 100:1, preferably less than 80:1 and more preferably less than 60:1.

After completion of the startup procedure, i.e. when temperature, pressure and composition of the reactor contents no longer change significantly as a function of time, the concentration of the carboxylic anhydride used as a telogen in the reactant mixture (feed) fed to the polymerization reactor is between 0.03 and 30 mol %, preferably from 0.05 to 20 mol %, more preferably from 0.1 to 10 mol %, based on the THF used.

When a carboxylic acid is used in addition, the molar ratio in the feed of the proceeding polymerization is typically from 1:20 to 1:20 000, based on carboxylic anhydride used.

When comonomers are additionally used, the molar ratio in the feed of the proceeding polymerization is customarily from 0.1 to 50 mol %, preferably from 0.5 to 40 mol %, more preferably from 1 to 30 mol %, based on THF used.

When the polymerization has been carried out in a suspension method, it is necessary for the workup of the polymerization effluent to remove the predominant portion of the polymerization catalyst from the polymerization mixture, for example by filtration, decantation or centrifugation, and to feed the polymerization effluent obtained to the further workup. In the preferred fixed bed method, the polymerization effluent is directly worked up further.

The particularly preferred PTHF acetates or THF copolymer acetates may be worked up by methods known per se. For example, after distillative removal of unconverted THF and any acetic anhydride, acetic acid and comonomer, the PTHF acetate or THF copolymer acetate obtained is transesterified under base catalysis with methanol to give PTHF or THF copolymer and methyl acetate.

If desired, low molecular weight PTHF and/or tetrahydrofuran copolymer of an average molecular weight of from 200 to 700 dalton may subsequently be removed distillatively. The distillation residue remaining is PTHF or THF copolymer having average molecular weights of from 650 to 10 000 dalton.

After use in a batchwise or continuously operated PTHF process, the catalysts may be regenerated, for example by thermal treatment, as described in EP-A-0 535 515, and/or by washing the catalyst with aqueous and/or organic solvents.

The mono- and diacetates of PTHF and of THF copolymers obtained can be converted to polytetrahydrofuran by processes known per se, for example those described in U.S. Pat. No. 4,460,796.

EXAMPLES

The invention is illustrated hereinbelow by examples.

Catalyst A 350 g of an acid-activated bentonite (bleaching earth K10, Südchemie) were intensively kneaded with 260 ml of water in a laboratory kneader for 26 min, subsequently extruded to extrudates of diameter 2.5 mm and average length 10 mm, dried and calcined at 350° C. The pore radius distribution (Hg porosimetry) of this catalyst is bimodal with maxima in the region of 60 Å and 1000 Å pore radius, and the porosity in the pore radius range of 200 Å-3000 Å is 0.15 cm$^3$/g.

Molecular Weight Determination

The average molecular weight ($M_n$) of the polyTHF or the polyTHF copolymer obtained was determined by gel permeation chromatography (GPC) and is defined by the equation $$M_n = \Sigma c_i / \Sigma (c_i/M_i)$$

where $c_i$ is the concentration of the individual polymer species i in the polymer mixture obtained and $M_i$ is the molecular weight of the individual polymer species i.

The polydispersity D as a measure of the molecular weight distribution of the polymers prepared according to the examples was calculated from the ratio of the weight-average molecular weight ($M_w$) and number-average molecular weight ($M_n$) by the equation $$D = M_w/M_n.$$

Mw and Mn were determined by means of GPC, using a standard polyTHF for calibration. The chromatograms obtained were used to calculate the number average $M_n$ by the equation $$M_n = \Sigma c_i / \Sigma(c_i/M_i)$$

and the weight average Mw by the equation $$M_w = (\Sigma(c_i * M_i))/\Sigma ci$$

where $c_i$ is the concentration of the individual polymer species i in the polymer mixture obtained and $M_i$ is the molecular weight of the individual polymer species i.

Example 1

In a reactor of volume 400 ml, 170 g of the acidic catalyst A (similar to catalyst 1 from example B of DE 101 30 782) were dried at 150° C. for 24 h. After cooling to 34° C., a mixture consisting of 60% by weight of polytetrahydrofuran diacetate of average molar mass 1950 dalton, 37% by weight of THF and 3% of acetic anhydride was introduced into the reactor from below. After 5 minutes, the catalyst bed was completely wetted; during the charging procedure, the temperature in the catalyst bed rose from 34° C. to 42° C. A circulation pump was used to achieve a liquid circulation through the catalyst bed of 1 l/h. After stabilizing the reaction temperature to 40° C., a mixture of 96.9% by weight of THF and 3.1% by weight of acetic anhydride was added to the circulated liquid stream at a rate of 11.5 g/h. The analysis of the reactor effluent after operation for 13 days showed a polymer content of 57.7% having an average molar mass of 2002 dalton and a polydispersity of 2.4. The conversion of acetic anhydride was 95%.

Example 2

The polymerization reactor was started up in a similar manner to example 1, except using a mixture of 61.5% by weight of polytetrahydrofuran diacetate of average molar mass 2022 dalton, 37.5% by weight of tetrahydrofuran and 1% by weight of acetic anhydride. During the charging, the temperature rose from 34° C. to 42° C. The arrangement was then continuously operated as in example 1. After 13 days, the polymer content in the reactor effluent was 57.7% (average molar mass 2025 dalton) and the conversion of acetic anhydride was 94.7%.

Example 3

In the apparatus described in example 1, the catalyst was not dried after introduction. In a separate experiment, it was determined that the catalyst used still contained 1.5% of water, determined as the drying loss at 150° C. The fixed catalyst bed was started up using a mixture of 59.5% by weight of polytetrahydrofuran diacetate of average molar mass 1784 dalton, 36.5% by weight of tetrahydrofuran and 4% by weight of acetic anhydride. During the charging, the temperature rose from 35° C. to 40° C. The arrangement was then continuously operated as in example 1. After 15 days, the polymer content in the reactor effluent was 56.7% (average molar mass 2014 dalton, polydispersity 2.1) and the conversion of acetic anhydride was 93.9%.

Comparative Example 1

The polymerization reactor was started up in a similar manner to example 1, except using a noninventive mixture of 96.9% by weight of tetrahydrofuran and 3.1% by weight of acetic anhydride. During the charging, the temperature rose from 34° C. to 56° C. The arrangement was then continuously operated as in example 1. After 11 days, the polymer content in the reactor effluent was 54.7% (average molar mass 2025 dalton, polydispersity 2.2) and the conversion of acetic anhydride was 93.2%.

We claim:

1. A process for preparing mono- or diesters of polytetrahydrofuran or of tetrahydrofuran copolymers comprising polymerizing tetrahydrofuran in the presence of at least one telogen and/or of a comonomer over an acidic catalyst, wherein the polymerization reactor is started up using a mixture of the polymer to be prepared by the process, polytetrahydrofuran, the mono- or diesters of polytetrahydrofuran and/or of the tetrahydrofuran copolymers, tetrahydrofuran, any comonomer and at least one carboxylic anhydride, wherein the concentration of the polymer product used for startup is from 20 to 80% by weight, based on the total amount of the mixture used for startup.

2. The process according to claim 1, wherein the mono- or diesters of polytetrahydrofuran or of the tetrahydrofuran copolymers or the polytetrahydrofuran used for startup have an average molecular weight $M.\mathrm{sub}.n$ of from 650 to 4000.

3. The process according to claim 1, wherein the mixture used for startup comprises from 7 to 80% by weight of tetrahydrofuran or the total amount of tetrahydrofuran and comonomer, based on the total amount of the mixture used for startup.

4. The process according to claim 1, wherein from 0.5 to 10% by weight of carboxylic anhydride are used for startup, based on the entire amount of the mixture used for startup.

5. The process according to claim 1, wherein acetic anhydride is used.

6. The process according to claim 1, wherein, in addition to the carboxylic anhydride, up to 3% by weight, based on the total amount of the mixture used for startup, of carboxylic acid are used.

7. The process according to claim 1, wherein an inert solvent is added to the mixture used for staffing up the polymerization reactor.

8. The process according to claim 2, wherein the mixture used for startup comprises from 7 to 80% by weight of tetrahydrofuran or the total amount of tetrahydrofuran and comonomer, based on the total amount of the mixture used for startup.

9. The process according to claim 2, wherein from 0.5 to 10% by weight of carboxylic anhydride are used for startup, based on the entire amount of the mixture used for startup.

10. The process according to claim 3, wherein from 0.5 to 10% by weight of carboxylic anhydride are used for startup, based on the entire amount of the mixture used for startup.

11. The process according to claim 2, wherein acetic anhydride is used.

12. The process according to claim 3, wherein acetic anhydride is used.

13. The process according to claim 4, wherein acetic anhydride is used.

14. The process according to claim 2, wherein, in addition to the carboxylic anhydride, up to 3% by weight, based on the total amount of the mixture used for startup, of carboxylic acid are used.

* * * * *